March 20, 1956 — G. CIVITELLI — 2,738,568
RASP OR FILE
Filed Aug. 11, 1953 — 2 Sheets-Sheet 1
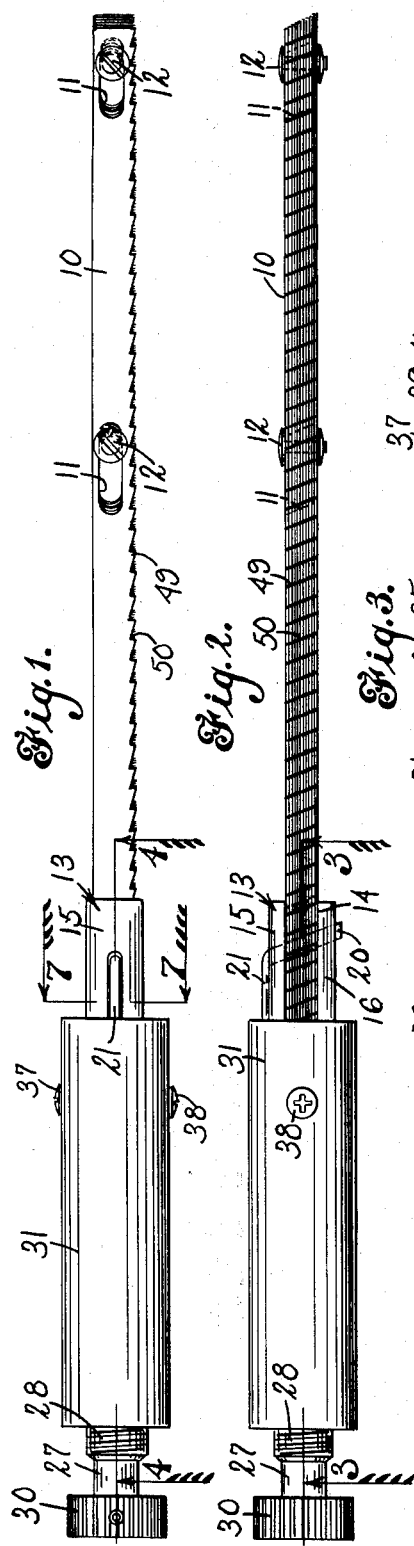
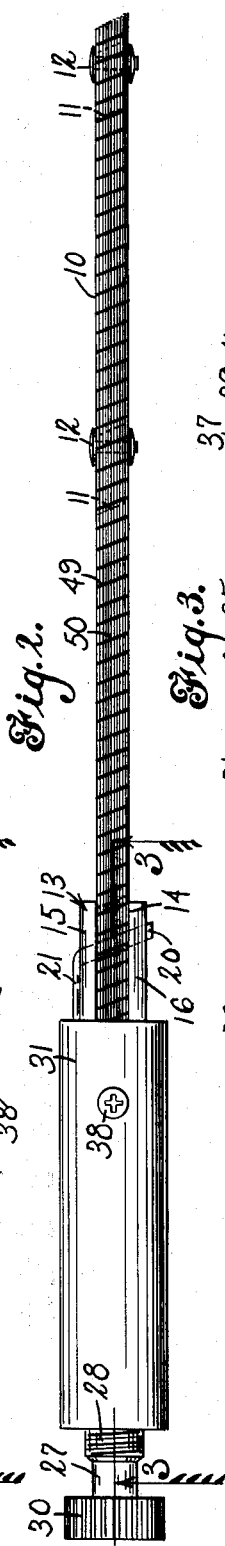
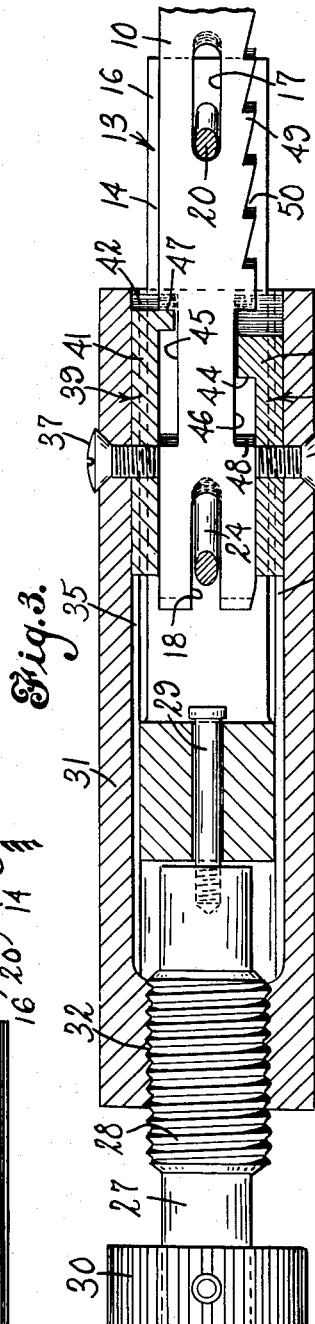
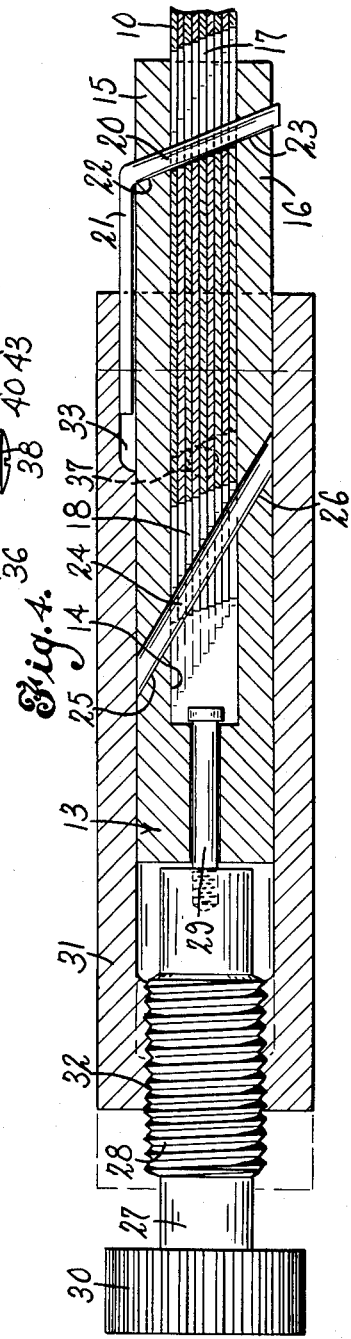
INVENTOR
Gennaro Civitelli
BY
ATTORNEYS March 20, 1956 G. CIVITELLI 2,738,568
RASP OR FILE
Filed Aug. 11, 1953 2 Sheets-Sheet 2
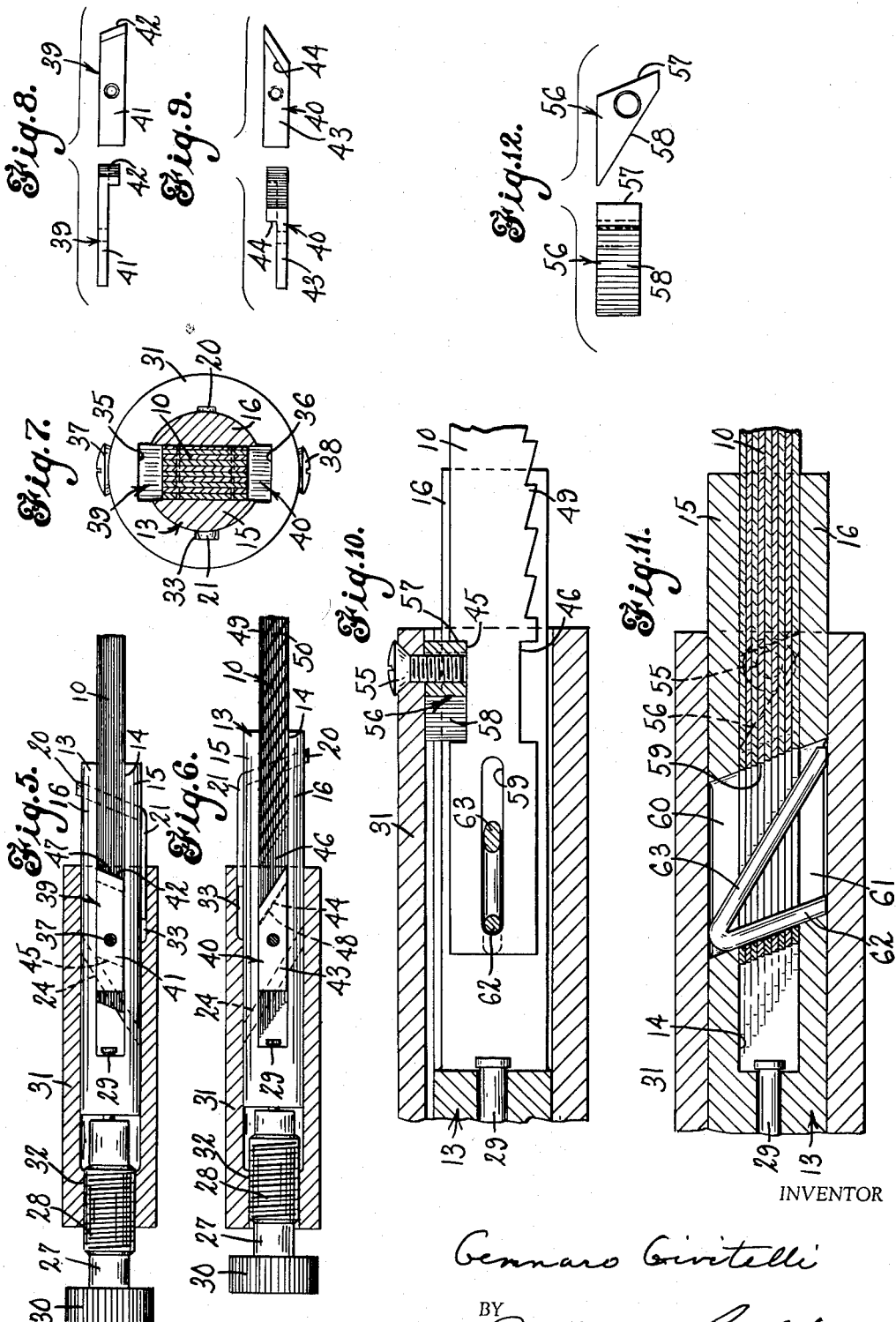
INVENTOR
Gennaro Civitelli
BY
Rockwell & Southern
ATTORNEYS

United States Patent Office 2,738,568
Patented Mar. 20, 1956

2,738,568
RASP OR FILE

Gennaro Civitelli, Hamden, Conn.

Application August 11, 1953, Serial No. 373,527

12 Claims. (Cl. 29—79)

This invention relates to files or rasps and more particularly to an article of this character which may be formed of a plurality of parts, such, for example, as hacksaw blades.

It has heretofore been proposed to provide an abrasive tool such as a file or rasp, the blade of which is composed of a plurality of hacksaw blades secured flatwise against each other, the teeth of the blades forming the rough surface of the tool. It is well known that in the use of a tool of this character the characteristics of the blade must be suited to that of the work to be done, that is, a coarse or fine rasp or file is desired depending upon the hardness of the work upon which the tool is used and also to some extent upon other conditions.

It is, therefore, contemplated by the present invention to provide a tool in the nature of a rasp or file constructed of a plurality of hacksaw blades secured flatly together which shall be capable of easy adjustment so that a tool with a fine or coarse cutting edge may be provided. To this end the blades, while being secured firmly together, are nevertheless so secured that they are capable of adjustment one relatively to the other so as to adjust the position of the teeth of one blade relatively to the adjoining blades, and thus provide either a fine or coarse tool.

Preferably the blades are slotted and fastening means are passed through these slots to secure the blades together, the fastening members being smaller than the slots so that some relative lengthwise movement of the blades is provided. Usually the teeth of the blades will be aligned transversely of the tool, each line of the teeth, however, making an acute angle with the axis of the tool. It will be found that when the teeth are aligned in this way, the sharper the angle which is formed between the axis or lengthwise dimension of the tool and the line formed by the ridges of corresponding teeth, the finer will be the rasp. This arises from the fact that when the ridges of the teeth are aligned in a manner substantially transverse or at right angles to the longitudinal axis of the tool, the spaces between adjacent ridges will be greater and the file or rasp will be coarser.

One object of the present invention is to provide a tool with an abrasive edge or surface which is simple in structure, economical to manufacture, and adjustable so as to provide either a coarse or fine working surface.

A still further object of the invention is the provision of a tool of the character described in which the working portion of the tool comprises a plurality of hacksaw blades so secured together that they may be adjusted one relatively to the other to adjust the working surface of the tool for fine or coarse work.

A further object of the invention is to provide an abrasive tool of the character described wherein the blades, of which the working portion of the tool is composed, may be readily and easily adjusted one relatively to the other without disassembling the parts of the tool or without the use of other tools.

A still further object of the invention is to provide an abrasive tool of the character described wherein the blades which constitute the working portion of the tool may be shifted at will, one relatively to the other, by a simple rotary motion of a manually engageable member.

To these and other ends the invention consists in the novel features and combinations of parts to be hereinafter described and claimed.

In the accompanying drawings:

Fig. 1 is a side elevational view of a rasp or file embodying my invention;

Fig. 2 is a bottom plan view thereof;

Fig. 3 is a sectional view on line 3—3 of Fig. 2;

Fig. 4 is a sectional view on line 4—4 of Fig. 1;

Fig. 5 is a top plan view of the tool with the body or sleeve member shown in section;

Fig. 6 is a bottom plan view of the tool with the sleeve member shown in section;

Fig. 7 is a transverse sectional view on line 7—7 of Fig. 1;

Fig. 8 comprises detail views of one of the cams;

Fig. 9 is a view similar to Fig. 8 showing the other cam;

Fig. 10 is a sectional view similar to Fig. 3 showing a modified form of my invention;

Fig. 11 is a sectional view taken at right angles to that shown in Fig. 10; and

Fig. 12 comprises top and side views of the cam employed in the modification shown in Figs. 10 and 11.

To illustrate a preferred embodiment of my invention I have shown in Fig. 1 of the drawings a rasp or file formed of a plurality of hacksaw blades designated by the numeral 10. Each of these blades may be provided with elongated slots 11 through which are inserted rivets or bolts 12 designed to hold the blades flatly together so that there will be no lateral play but at the same time permit the blades to be moved one relatively to the other in a longitudinal direction as allowed by the length of the slots.

As shown more especially in Figs. 2 and 4, a socket member is provided to receive the inner ends of the blades, this member having a base portion 13 and being slotted to provide an opening 14 within which the ends of the blades are received between the walls 15 and 16 upon the sides of the slots. As shown, the slot extends entirely through the socket member, but it may, of course, only be sufficiently large to slidably and snugly receive the blades 10.

As shown in Figs. 3 and 4, the blades are also provided with slots 17 and 18, and pins are passed through openings in the members 15 and 16 and through the slots of the blades. One of these pins 20 is inclined to a slight extent with respect to the longitudinal axis of the blades and is provided with an end portion 21, the purpose of which will be hereinafter described. The portion 20 of this pin passes snugly through openings 22 and 23 in the walls 15 and 16 of the socket member. A second pin 24 is passed through openings 25 and 26 in the walls of the socket member and, as will be noted from Fig. 4, lies at a more acute angle with respect to the longitudinal axis of the blades than does the pin 20. The ends of the pin 24 are substantially flush with the exterior surfaces of the walls 15 and 16.

A manually operable adjusting member 27 provided with screw threads 28 is connected to the socket member 13 so as to be rotatable relatively to this member but at the same time to be secured thereto against longitudinal movement. For this purpose a headed screw 29 is secured to the member 27 and rotatably received in an opening in the member 13. Upon the rear end of the member 27 is a knurled knob 30 by which it may be grasped for manual rotation.

The socket member 13 together with the forward end of the adjusting member 27 is received in a handle sleeve 31 which, as shown, is exteriorly of cylindrical form and has a generally cylindrical opening therein which snugly receives the member 13. At its rear end the sleeve member 31 is provided with internal screw threads 32 to receive the threads 28 upon the member 27 so as to threadedly connect these two parts. It will be obvious that when the member 27 is rotated by the knurled knob 30, the sleeve 31 will be advanced toward or retracted from the outer free end of the member 13.

Communicating with the bore of the handle sleeve 31 is a longitudinal slot or recess 33 which opens outwardly through the forward end of the sleeve member and slidably receives the longitudinally extending end 21 of the pin 20 so as to maintain this pin in place. This slot is sufficiently long to permit relative movement of the members 13 and 31 for a purpose to be hereinafter described.

Also formed at the inner surface of the handle sleeve 31 are longitudinally extending slots 35 and 36, these slots, as shown in Fig. 7, being diametrically opposite each other and positioned at substantially 90 degrees from the slot 33. Secured in these slots by screws 37 and 38 are cam members, shown in Figs. 8 and 9 and designated generally by the numerals 39 and 40. The cam 39 has a longitudinally extending body portion 41 and a cam surface 42 which is slightly inclined with respect to the longitudinal dimension of the member, the inclination of this active surface 42 of the cam being substantially the same as that of the pin 20. The cam 40 is provided with a body portion 43 and an active cam surface 44 which is sharply inclined with respect to the longitudinal axis of the body and inclined at substantially the same angle as the pin 24.

As shown more especially in Fig. 3, a recess 45 is provided in one edge of each of the blades, the recesses all respectively being in substantial registration so that as shown in this figure, when the blades are in place, the cam face 42 of the member 39 will lie in the recesses 45 while the cam face 44 of the member 40 will lie in the recesses 46, provided in the edges of the blades opposite the recesses 45. The recesses 45 terminate at their forward ends in abrupt shoulders 47 to be engaged by the outer cam surface 42 of the member 39 while the recesses 46 are provided with abrupt shoulders 48 to be engaged by the inner cam surface 44 of the member 40.

As shown, only one edge of the blades is provided with teeth indicated at 49, the teeth having ridges 50. If desired, however, similar teeth may be provided upon the other edges of each of the blades.

As described, the rear ends of the blades 10 are snugly received between the members 15 and 16 of the socket member 13 and their projecting ends are held snugly together by the securing members 12. The blades are, however, permitted relative longitudinal movement with respect to each other as permitted by the pins 20 and 24 and the slots 17 and 18 through which these pins extend and the slots 11 through which extend the fastening members 12.

It will be apparent that if the knurled adjusting knob 30 is rotated relatively to the sleeve member 31, the latter will be advanced or retracted relatively to the rear end of the member 13. As shown in full lines in Figs. 3 and 4, the sleeve member 31 is in its most advanced position relatively to the member 13. In this position of the parts the cam surface 42 of the cam 39 impinges against the shoulders 47 and moves the blades to the position shown in full lines in Figs. 2, 3 and 4. It will be noted from Fig. 4 that in this position of the parts the rear ends of the slots 17 have been moved forwardly to lie against the pin 20, thus limiting the forward movement of the blades in the socket 13, and the blades are not only moved to this position by the cam member 42, but are held in this position against retraction until the cam is moved rearwardly. It will be noted from Fig. 2 that the ridges 50 of the teeth 49 make only a slight angle with the axis of the blades so that these ridges are a substantial distance apart, thus leaving large spaces between the ridges and forming a coarse rasp or file.

When it is desired to employ a rasp or file for finer work, the adjusting knob 30 is turned to move the handle member or sleeve 31 to the dotted-line position shown in Fig. 4 or rearwardly with respect to the socket member 13. This will cause the inclined surface 44 of the cam member 40 to engage the shoulders 48 of the notch 46 and move the blades rearwardly (the blades at one side progressively more than those at the other side) to the dotted-line position shown in Fig. 4 wherein the front walls of the slots 18 of the blades are drawn rearwardly against the pin 24, the pin serving as a stop to prevent further movement of the blades. The latter are now in the position shown in Fig. 6, and it will be noted that the lines across the ridges of the teeth are more sharply inclined relatively to the lengthwise axis of the tool, thus providing for a finer cut.

It will be noted that in this position of the file the blades are securely held between the inclined surfaces 44 of the cam members and the pin 24, the clamping of the blades between these two members preventing any play or looseness thereof in a longitudinal direction. Likewise, when the blades are adjusted to the position shown in Figs. 2 and 3 and in full lines in Fig. 4, they will be securely held between the cam surfaces 42 and the pin 20 so that no longitudinal movement will be permitted until the handle or sleeve member 31 is adjusted by manipulation of the knob 30.

In Figs. 10 to 12 of the drawings, I have shown a modified form of my invention wherein a single cam replaces the cams 39 and 40 and also a single pin replaces the pins 20 and 24. Otherwise the structure is substantially the same as that previously described. It will be understood that in this case the single cam member has two cam surfaces, one of which acts to move the blades to one position and the other acts to move them to the other position. Likewise the pin is bent into a modified V-shaped form so that one leg of the pin is operative when the blades are in one position and the other leg when the blades are in the other position.

As shown in Fig. 10 of the drawing, the blades 10 are provided with slots 45 and 46 as before but only one of these slots will be used at one time. Secured to the handle sleeve 31 by the screw 55 is a cam member 56 which will operate in one of the slots 45 depending upon whether the blades are turned in one direction or the other. This cam member 56 is shown in Fig. 12 and is provided with a slightly inclined cam surface 57 and a sharply inclined cam surface 58. Likewise the blades are each provided with a slot 59, as shown in Fig. 11, and the socket members 15 and 16 are provided with slots 60 and 61. A pin of modified V-shaped form is mounted in the slots 60 and 61 to extend through the slots 59 of the blades, this pin having an inclined end 62 at substantially the same inclination as the surface 57 of the cam member 56 and a leg 63 which is sharply inclined with respect to the longitudinal axis of the blades, this leg of the pin having the same inclination as the cam surface 58.

It will be understood that the same arrangement consisting of the screw 28 and knob 30 is provided for moving the socket 13 with respect to the handle sleeve 31 as was described in connection with that modification of my invention shown in Figs. 1 to 9. When the sleeve member 31 is moved forwardly upon the socket member 13 the cam surface 57 will engage the front walls of the recesses 45 and move the blades to the position shown in Fig. 11 where the rear walls of the slots 59 of the blades are moved against the leg 62 of the pin. This provides the same arrangement of the teeth shown in Fig. 2 of the drawings wherein the file or rasp is suitable for coarse work. When, however, the sleeve handle 31 is moved rearwardly with respect to the socket 13, the cam surface 58 of the cam 56 acts against the rear walls of the slots 45 in the blades and moves the blades rearwardly until the forward walls of the slots 59 lie against the leg 63 of the pin, as shown in dotted lines in Fig. 11. In this position of the parts, the rasp is suitable for fine work, the blades being in the position shown in Fig. 6.

While I have shown and described some preferred embodiments of my invention, it will be understood that it is not to be limited to all of the details shown, but is capable of modification and variation within the spirit of the invention and within the scope of the claims.

What I claim is:

1. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, and means for positively moving certain of said blades to adjust them in a longitudinal direction relatively to the adjacent blades while holding them against relative transverse movement to vary coarseness of the cutting edge of the tool without changing its contour, said means for securing the blades together comprising elongated slots extending longitudinally of the blades and pins passing through said slots.

2. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, and means for positively moving certain of said blades to adjust them in a longitudinal direction relatively to the adjacent blades while holding them against relative transverse movement to vary coarseness of the cutting edge of the tool without changing its contour, said last-named means comprising cam members having inclined surfaces to engage portions of the blade.

3. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, and means for positively moving certain of said blades to adjust them in a longitudinal direction relatively to the adjacent blades while holding them against relative transverse movement to vary coarseness of the cutting edge of the tool without changing its contour, said last-named means comprising cam means having a plurality of inclined surfaces to engage portions of the blades, and the inclination of one of said surfaces being different from that of the other.

4. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, means for positively moving certain of said blades to adjust them in a longitudinal direction relatively to the adjacent blades while holding them against relative transverse movement to vary coarseness of the cutting edge of the tool without changing its contour, and means for limiting the relative movement of the blades to limit the adjustment of each blade with respect to the adjacent blade.

5. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, means for adjusting certain of said blades in a longitudinal direction relatively to the adjacent blades to vary coarseness of the cutting edge of the tool without changing its contour, a socket member to receive the ends of the blades, a sleeve member adjustably mounted on said socket member, and cam means adjustably carried by said sleeve member to engage the blades.

6. An abrasive tool comprising a working portion constituted by a plurality of longitudinally extending blades held flatly together and a handle portion in which the blades are received at one end thereof, means securing said blades together to permit relative longitudinal movement thereof but preventing relative transverse movement of the blades, a socket member within the handle portion to receive the ends of the blades, a sleeve member adjustable on said socket member, cam means carried by said sleeve member, means providing shoulders on the edges of the blades, and said cam means engaging said shoulders to effect relative adjustment of the blades when said sleeve member is adjusted on the socket member.

7. An abrasive tool comprising a working portion constituted by a plurality of longitudinally extending blades held flatly together and a handle portion in which the blades are received at one end thereof, means securing said blades together to permit relative longitudinal movement thereof but preventing relative transverse movement of the blades, a socket member within the handle portion to receive the ends of the blades, a sleeve member adjustable on said socket member, cam means carried by said sleeve member, means providing shoulders on the edges of the blades, said cam means engaging said shoulders to effect relative adjustment of the blades when said sleeve member is adjusted on the socket member, said cam means having a plurality of cam surfaces to engage said blade, and said surfaces being inclined relatively to the longitudinal axis of the tool.

8. An abrasive tool comprising a working portion constituted by a plurality of longitudinally extending blades held flatly together and a handle portion in which the blades are received at one end thereof, means securing said blades together to permit relative longitudinal movement thereof but preventing relative transverse movement of the blades, a socket member within the handle portion to receive the ends of the blades, a sleeve member adjustable on said socket member, cam means carried by said sleeve member, means providing shoulders on the edges of the blades, said cam means engaging said shoulders to effect relative adjustment of the blades when said sleeve member is adjusted on the socket member, said blades being provided with elongated slots, and stop members passing through said slots for limiting the adjustment of the blades, said stop members being inclined relatively to the longitudinal axis of the blades.

9. An abrasive tool comprising a working portion constituted by a plurality of longitudinally extending blades held flatly together and a handle portion in which the blades are received at one end thereof, means securing said blades together to permit relative longitudinal movement thereof but preventing relative transverse movement of the blades, a socket member within the handle portion to receive the ends of the blades, a sleeve member adjustable on said socket member, cam means carried by said sleeve member, means providing shoulders on the edges of the blades, said cam means engaging said shoulders to effect relative adjustment of the blades when said sleeve member is adjusted on the socket member, and means for adjusting said sleeve member comprising a member rotatably carried by the socket member and threadedly engaged with the sleeve member.

10. An abrasive tool comprising a working portion constituted by a plurality of longitudinally extending blades held flatly together and a handle portion in which the blades are received at one end thereof, means securing said blades together to permit relatively longitudinal movement thereof but preventing relative transverse movement of the blades, a socket member within the handle portion to receive the ends of the blades, a sleeve member adjustable on said socket member, cam means carried by said sleeve member, means providing shoulders on the edges of the blades, said cam means engaging said shoulders to effect relative adjustment of the blades when said sleeve member is adjusted on the socket member, means for adjusting said sleeve member comprising a member rotatably carried by the socket member and threadedly engaged with the sleeve member, and said adjusting member projecting rearwardly from the sleeve member to be accessible for manual manipulation.

11. An abrasive tool comprising a working portion constituted by a plurality of longitudinally extending serrated blades held flatly together and a handle member in which the blades are received at one end thereof, means securing said blades together against a transverse separating movement with their cutting edges in substantially coplanar relation but permitting relative longitudinal movement thereof, a socket member in the handle portion to receive the blades, a sleeve member adjustably mounted for movement relatively to the socket member in a direction longitudinal of the blades, and cam means carried by said sleeve member to engage the blades and adjust the position thereof when said member is adjusted relatively to the socket member.

12. An abrasive tool as in claim 11 wherein the cam means consists of a single cam member carried by the adjustable member, said cam member having a pair of inclined surfaces adapted to engage parts of the blade, and one of said surfaces being operative when the adjustable member is adjusted in one direction and the other being operative when said member is adjusted in the other direction.

References Cited in the file of this patent

UNITED STATES PATENTS

| 621,378 | Shoemaker | Mar. 21, 1899 |
|---|---|---|
| 1,035,736 | Puppe | Aug. 13, 1912 |
| 1,273,184 | Ramson | July 23, 1918 |

FOREIGN PATENTS

| 560,035 | France | Sept. 26, 1923 |